(12) United States Patent
Boratav et al.

(10) Patent No.: US 8,393,177 B2
(45) Date of Patent: Mar. 12, 2013

(54) GLASS FLOW MANAGEMENT BY THERMAL CONDITIONING

(75) Inventors: Olus N. Boratav, Ithaca, NY (US); Keith R. Gaylo, Painted Post, NY (US); Kiat C. Kang, Painted Post, NY (US); Bulent Kocatulum, Horseheads, NY (US); Steven M. Milillo, State College, PA (US); Douglas G. Neilson, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 733 days.

(21) Appl. No.: 12/430,334

(22) Filed: Apr. 27, 2009

(65) Prior Publication Data

US 2010/0269545 A1    Oct. 28, 2010

(51) Int. Cl.
*C03B 17/00* (2013.01)

(52) U.S. Cl. ............................. 65/128; 65/346
(58) Field of Classification Search ............ 65/128, 65/346
See application file for complete search history.

(56) References Cited

U.S. PATENT DOCUMENTS

| | | | | |
|---|---|---|---|---|
| 5,634,958 A * | 6/1997 | Sorg et al. | | 65/135.1 |
| 6,799,439 B1 * | 10/2004 | Lindskog et al. | | 65/29.11 |
| 7,650,764 B2 * | 1/2010 | Sakai et al. | | 65/346 |
| 2003/0029199 A1 | 2/2003 | Pitbladdo | | 65/195 |
| 2005/0268658 A1 * | 12/2005 | Adamowicz et al. | | 65/53 |
| 2006/0016219 A1 | 1/2006 | Pitbladdo | | 65/29.21 |
| 2006/0242994 A1 * | 11/2006 | Boratav et al. | | 65/90 |
| 2007/0084247 A1 * | 4/2007 | Pitbladdo | | 65/346 |
| 2011/0113827 A1 * | 5/2011 | De Angelis et al. | | 65/29.14 |
| 2011/0126595 A1 * | 6/2011 | Braglia | | 65/135.1 |

\* cited by examiner

*Primary Examiner* — Joseph Del Sole
*Assistant Examiner* — Russell Kemmerle, III
(74) *Attorney, Agent, or Firm* — Thomas R. Beall (57) ABSTRACT

Methods and apparatus for controlling glass flow in, for example, a downdraw glass manufacturing process (e.g., the fusion downdraw process) are provided. In certain aspects, the mass, thickness, and/or the temperature distribution of molten glass (40) on the surface of forming apparatus (60) is managed by: (A) constructing a stream-tube mapping between (i) regions (510; FIG. 5A) of a cross-section of a conduit (400) that supplies molten glass (40) to the forming apparatus (60) and (ii) regions (510; FIG. 5B) on the exterior surface of the forming apparatus (60); (B) using the stream-tube mapping to select a temperature distribution for the cross-section that results in a desired mass, thickness, and/or temperature distribution of molten glass (40) on the surface of the forming apparatus (60); and (C) heating and/or insulating the conduit (400) so as to produce a temperature distribution for the cross-section which equals or at least approximates the distribution selected in step (B).

12 Claims, 7 Drawing Sheets

GLASS FLOW MANAGEMENT BY THERMAL CONDITIONING

FIELD

This disclosure relates to methods and apparatus for controlling glass flow in, for example, a downdraw glass manufacturing process (e.g., the fusion downdraw process). The methods and apparatus are particularly well-suited for use in the manufacture of glass sheets such as the glass sheets used as substrates in display devices, e.g., liquid crystal displays (LCDs).

BACKGROUND

Display devices are used in a variety of applications. For example, thin film transistor liquid crystal displays (TFT-LCDs) are used in, among other things, notebook computers, flat panel desktop monitors, LCD televisions, and a variety of communication devices.

Many display devices, such as TFT-LCD panels and organic light-emitting diode (OLED) panels, are made directly on flat glass sheets (glass substrates). To increase production rates and reduce costs, a typical panel manufacturing process simultaneously produces multiple panels on a single substrate.

To take advantage of economics of scale, display manufacturers require ever larger substrates so that more displays and/or larger displays can be manufactured on an individual substrate. The production of larger substrates has proved challenging to the glass manufacturing industry, especially in view of the fact that the substrate thickness is typically less than a millimeter, e.g., 0.7 millimeters. Particularly challenging has been the problem of managing the behavior of molten glass on the forming apparatus (e.g., isopipe) used to produce the substrate.

The present disclosure addresses this problem and, among other things, provides methods and apparatus for thermally conditioning the molten glass before it reaches the forming apparatus so as to improve the glass' mass, thickness, and/or temperature distribution on the surface of the forming apparatus.

SUMMARY

In accordance with a first aspect, a method is disclosed of managing the mass, the thickness, and/or the temperature distribution of molten glass on the surface of forming apparatus of an overflow downdraw process which includes:

(A) constructing a stream-tube mapping between (i) regions of a cross-section of a conduit that supplies molten glass to the forming apparatus and (ii) regions on the exterior surface of the forming apparatus;

(B) using the stream-tube mapping to select a temperature distribution for the cross-section that results in a desired mass, thickness, and/or temperature distribution of molten glass on the surface of the forming apparatus; and (C) heating and/or insulating the conduit so as to produce a temperature distribution for the cross-section which equals or at least approximates the distribution selected in step (B).

In accordance with a second aspect, a method is disclosed of conveying molten glass which includes:

(A) passing the molten glass through a conduit having an entrance, an exit, a perimeter, and a length; and (B) at least one location along the conduit's length producing non-uniform heat transfer with the molten glass by:

(i) non-uniformly insulating the conduit's perimeter; or (ii) non-uniformly heating the conduit's perimeter; or (iii) non-uniformly insulating and non-uniformly heating the conduit's perimeter;

where the non-uniformity in insulating and/or heating is an azimuthal non-uniformity.

In accordance with a third aspect, a method is disclosed of conveying molten glass which includes passing the molten glass through a conduit having an entrance and an exit, wherein:

(A) the conduit comprises:
 (i) an entrance section,
 (ii) an intermediate section, and
 (iii) an exit section;
(B) the entrance and exit sections are substantially straight;
(C) the intermediate section is angled or curved; and
(D) more heat is applied to the intermediate section than to either the entrance or exit sections, or both the entrance and exit sections are less insulated than the intermediate section, or more heat is applied to the intermediate section than to either the entrance or exit sections and both the entrance and exit sections are less insulated than the intermediate section.

In accordance with a fourth aspect, an assembly is disclosed for conveying molten glass that includes:

(a) a conduit having an entrance, an exit, a perimeter, and a length;
(b) insulation for controlling heat loss from the perimeter; and
(c) a heat source for applying heat to the perimeter;

wherein at one or more locations along the length of the conduit:

(i) the heat source is configured to apply heat non-uniformly around the conduit's perimeter; or (ii) the insulation is configured to produce non-uniform heat loss from the conduit's perimeter; or (iii) the heat source is configured to apply heat non-uniformly around the conduit's perimeter and the insulation is configured to produce non-uniform heat loss from the conduit's perimeter.

Additional features and advantages of the invention are set forth in the detailed description which follows, and in part will be readily apparent to those skilled in the art from that description or recognized by practicing the invention as described herein.

It is to be understood that the foregoing general description and the following detailed description are merely exemplary of the invention and are intended to provide an overview or framework for understanding the nature and character of the invention as it is claimed.

The accompanying drawings are included to provide a further understanding of the invention, and are incorporated in and constitute a part of this specification. It is to be understood that the various aspects and features of the invention disclosed in the specification and in the drawings can be used in any and all combinations.

BRIEF DESCRIPTION OF THE DRAWINGS

FIG. 5 is a schematic diagram illustrating a mapping from the exit end of a delivery conduit (FIG. 5A) to the surface of an isopipe (FIG. 5B).

DETAILED DESCRIPTION OF THE PREFERRED EMBODIMENT

The following discussion is in terms of a fusion downdraw process (also known as a fusion process, an overflow downdraw process, or an overflow process), it being understood that the methods and apparatus disclosed and claimed herein are also applicable to other glass making processes including other downdraw processes such as a slot draw process. As fusion apparatus is known in the art, details are omitted so as to not obscure the description of the example embodiments.

Figure 1:
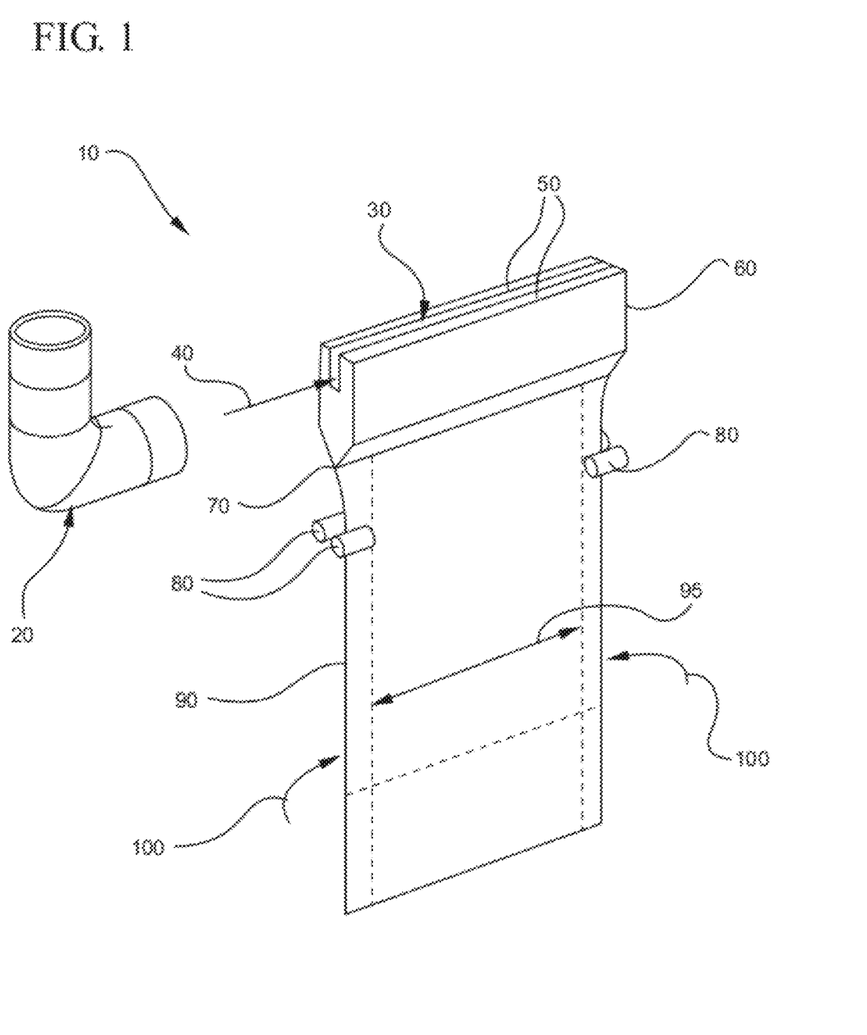
FIG. 1 is a schematic view of a fusion glass fabrication apparatus in accordance with an example embodiment.

As shown in FIG. 1, a typical fusion apparatus 10 employs a forming structure (isopipe) 60, which includes a trough 30 defined by weirs 50 for receiving molten glass 40. The molten glass is supplied to the isopipe by a delivery tube or conduit 20 which changes the direction of flow of the molten glass from substantially vertical to substantially horizontal. Molten glass is provided to delivery tube 20 by a substantially vertical tube (not shown), which typically is received within the delivery tube's entrance end. The diameter of the vertical tube (known as a "downcomer") is smaller than the diameter of the delivery tube's entrance end thus creating a free glass surface in the vicinity of the entrance end. As the molten glass passes through the delivery tube, its temperature is allowed to drop so as to increase the glass' viscosity. The amount of temperature drop is controlled so that the viscosity of the molten glass when received at the isopipe is suitable for the production of glass ribbon 90.

Figure 4:
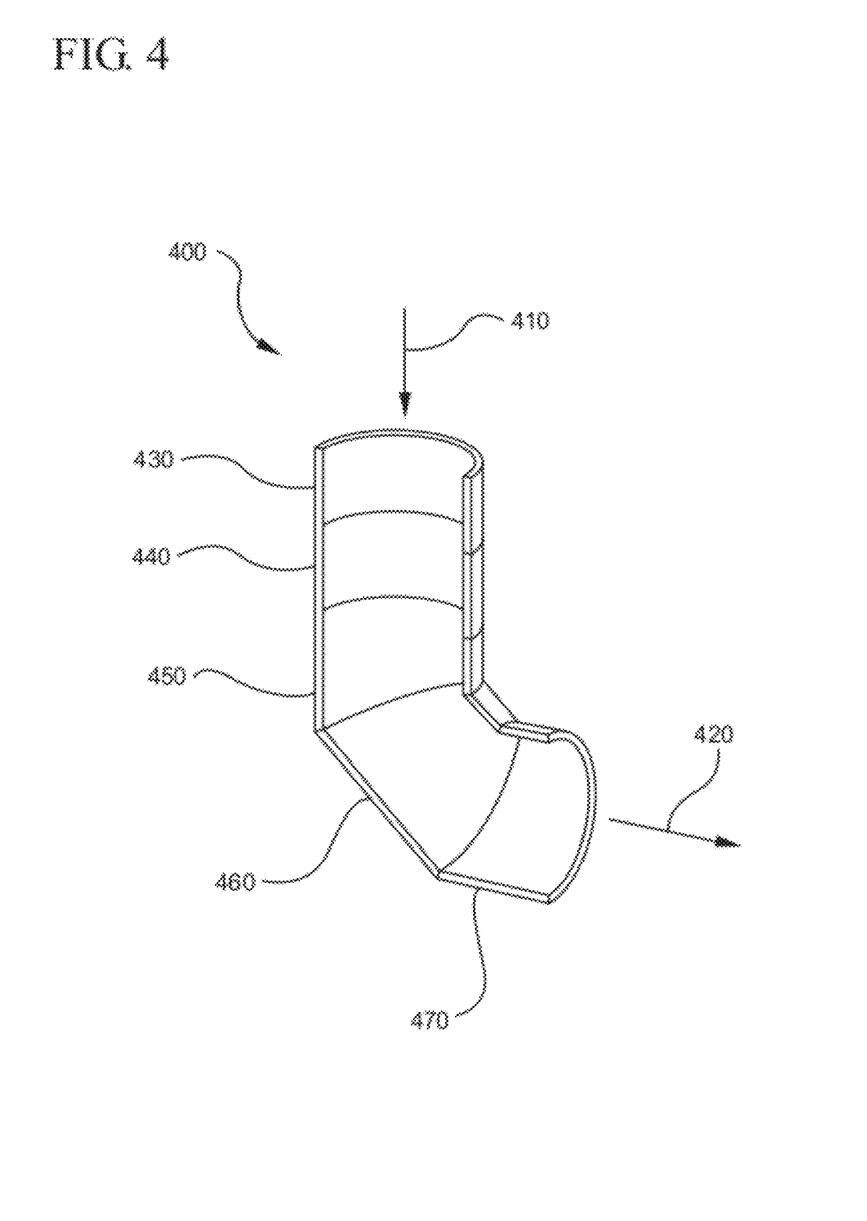
FIG. 4 is a schematic drawing, partially in section, illustrating a delivery tube having a straight entrance section, an angled intermediate section, and a straight exit section.

Delivery tube 20 (renumbered as 400) is shown in more detail in FIG. 4, where the flow of molten glass into the tube is represented by arrow 410 and the flow out of the tube by arrow 420. Reference numbers 430, 440, 450, 460, and 470 in this figure represent zones of the tube that can be separately heated by individual heating elements (windings). In particular, zones 430, 440, and 450 constitute the tube's substantially straight entrance section, zone 470 constitutes the tube's substantially straight exit section, and zone 460 constitute the tube's angled intermediate section. More or less zones can be used for each of these sections and the intermediated section can be curved if desired. As discussed below, by selecting the amounts of power applied to the windings of the various zones, the temperature distribution across the tube's exit face can be controlled so as to control the mass, thickness, and/or temperature distribution of the molten glass on the surface of the isopipe.

Referring again to FIG. 1, after leaving delivery tube 20, the molten glass flows into trough 30, over weirs 50, and down along the outer surfaces of the isopipe until it reaches the pipe's root 70. At that point, the two sheets of molten glass from the two converging sides of the isopipe join together to form a single ribbon 90. After leaving the root, the ribbon first traverses edge rollers 80 and then one or more sets of pulling rolls (not shown). The temperature of the edge rollers is below that of the glass, e.g., the edge rollers are water or air cooled. As a result of this lower temperature, the edge rollers locally reduce the glass' temperature. This cooling reduces the ribbon's attenuation, i.e., the local cooling helps control the reduction in the ribbon's width that occurs during drawing (e.g., through the action of the pulling rolls).

Production of glass substrates using the fusion process relies on an approximately uniform flow of molten glass per unit width (also termed the "flow density") on isopipe 60 to ensure that the thickness of the quality region portion 95 of glass ribbon 90 (see FIG. 2) is of uniform thickness to within acceptable product specifications. On either end of the isopipe, so-called "end effects" are responsible for increasing the flow density which is ultimately manifested by a thickness increase of the glass ribbon on its two vertical boundaries 100.

The increased thickness occurs over some finite width adjacent to the vertical boundaries and is termed the "bead" region; this glass is not utilizable by display manufacturers and is removed before substrates are shipped. However, the bead region serves a very useful function in that it provides surface area upon which the pulling rollers can contact the glass ribbon in order to "pull" glass off of the isopipe in a steady fashion while ensuring edge stability. This leaves the quality region free of any contact with mechanical surfaces that would likely cause damage to the pristine glass.

The flow per unit width across the isopipe including the quality region 95 and the two end regions 100 can be controlled by various means (e.g., by tilting the isopipe). Due to typical process variations and age-related drift in the isopipe's performance (i.e., over time the physical shape of the isopipe changes due to mechanical creep), it is necessary to make adjustments to the isopipe mechanical and thermal conditions to maintain the desired flow densities. The global thermal conditions in the delivery system upstream of the isopipe may also be adjusted in the effort to achieve the desired flow behavior on the isopipe. (The delivery system for molten glass is typically a platinum tube filled with the flowing glass that is connected to the inlet region of the ceramic isopipe.) In addition to adjustments necessitated by process variations and/or age-related drift, if the base flow rate of the process is increased to increase manufacturing efficiency, then often it is necessary to make similar mechanical/thermal changes to the isopipe and/or its near-upstream delivery system to ensure the desired flow densities on the isopipe.

Although approaches of the foregoing types have generally been able to control the flow densities, the results have not always been fully satisfactory. This is particularly true for controlling the flow per unit width on the ends of the isopipe. If this flow is not well-controlled, both the process and the product can be adversely affected. On the process side, the end flows are prone to a flow instability which causes irregularities in the overall width of the glass ribbon. It is thought that the instability, if severe enough, can actually contribute to a catastrophic failure of the process which manifests itself as the ribbon breaking up at its edges as it moves away from the isopipe.

Figure 2:
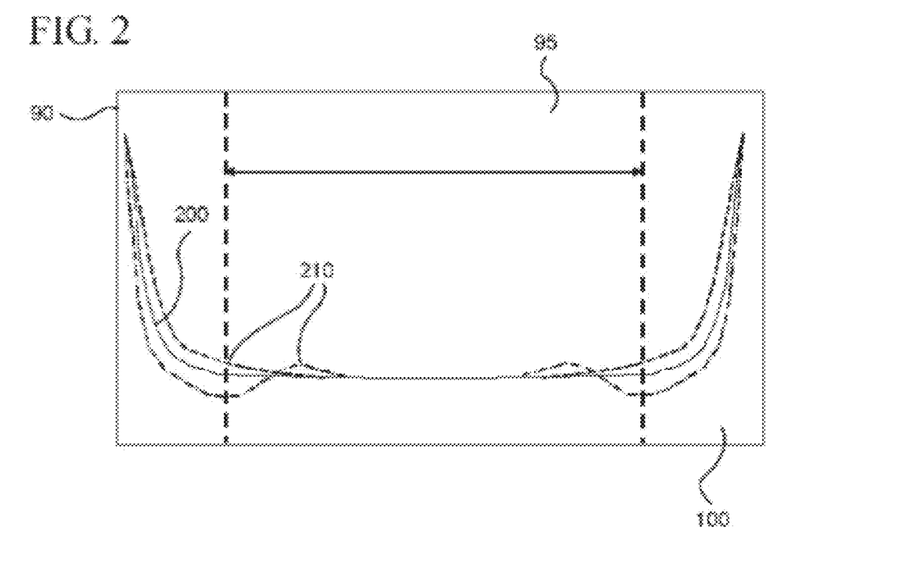
FIG. 2 is a schematic diagram illustrating glass thickness distributions of glass ribbons formed by a drawing process.

On the product side, if the flow density in the bead region is not well-controlled (i.e., it does not ramp from its high value to the lower, desired value associated with the quality region over an acceptable distance), then the bead region may encroach into the quality region thereby diminishing the portion of the ribbon that can be cut into sheets that are useable (utilizable) by display manufacturers. FIG. 2 illustrates this effect, where curve 200 shows the desired glass thickness and curves 210 show two examples of the types of thickness distributions that can reduce the size of quality region 95. In this figure, the vertical and horizontal axes represents glass thickness and distance across the glass ribbon, respectively.

The present disclosure provides methods and apparatus for improving the control of the mass flow distribution across an isopipe, with particular emphasis on the flow densities on the ends of the pipe. Variations in the flow per unit width across the isopipe are, in large part, due to the differing thermal histories of the stream-tubes that define the flow distribution. Changes to the thermal history of a particular stream-tube will result, in general, in a change in the flow density of that stream-tube. Thus, in accordance with certain embodiments, thermal histories of particular stream-tubes are positively affected by localized thermal control of the glass in the delivery system that feeds into the isopipe. Although global glass thermal control in delivery systems has been previously employed, it has not allowed for alteration of local thermal behavior. In accordance with the present disclosure, the local thermal behavior is controlled and that control, in turn, is used to manage flow densities at the isopipe.

In certain embodiments, discrete heating elements (e.g., windings) are placed adjacent to the wall of the isopipe's delivery system upstream of the entrance to the isopipe and individually controlled. Such discrete heating affords the opportunity to limit the thermal response of the glass to some portion of the entire volume of glass within the delivery tube. The affected region's flow density is thereby changed and can be leveraged to control, among other things, the mass flow distribution on the isopipe. Alternatively, the insulation surrounding the delivery system is divided into discrete elements which can be individually selected in terms of type and/or thickness of insulation, either at the time of original construction or during operation of the glass making process.

Among the advantages provided by such local thermal control are the following: (1) a means is provided to more finely alter/control specific mass flow densities along the width of the isopipe; (2) a means is provided for ensuring that the mass flow per unit width on the ends of the glass ribbon (i.e., the beads) remains steady and at the desired value(s); and (3) the stability of the process is improved.

Figure 3:
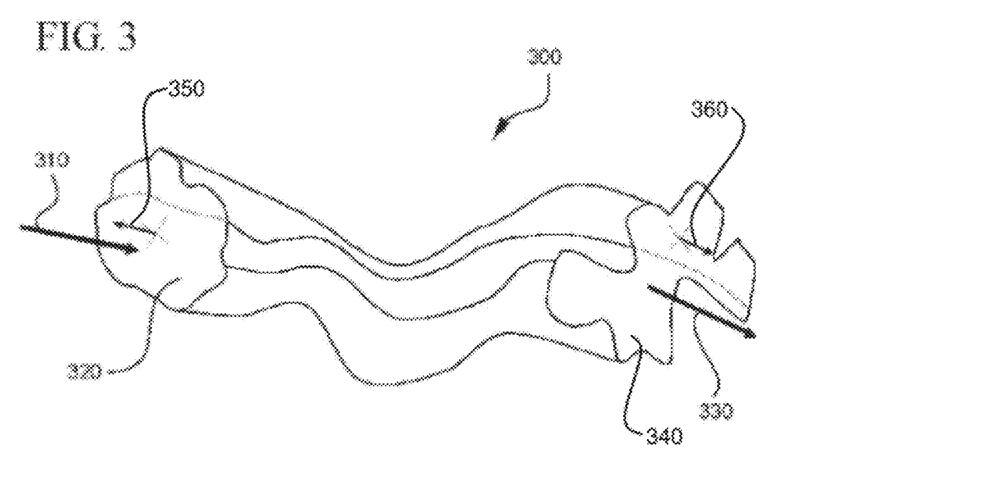
FIG. 3 is a schematic diagram illustrating a stream-tube.

It is known from fluid dynamics analysis that steady, incompressible (i.e., constant or nearly constant density) flow in a pipe can be subdivided into a number of stream-tubes. FIG. 3 shows such a stream-tube 300 where arrows 310, 330 represent the tube's flow under steady state conditions and arrows 350, 360 are the outward normals at cross-sections 320, 340, respectively. As illustrated in this figure, a stream-tube is a fluid mechanical descriptor or conception that is characterized by a fluid volume made up of the product of a cross-sectional area normal to the local flow direction and some total path length. The shape of the stream-tube is defined by its cross-sectional area which must remain normal to the local flow direction but can vary in size to ensure mass conservation (i.e., the product of the local velocity, cross-sectional area and fluid density). At steady-state, the mass flow within the stream-tube is a constant, which simply means that no mass flow may cross the boundary of the stream-tube into any adjacent stream-tube(s).

Stream-tubes are particularly useful in developing a mapping that spatially relates the start of a given stream-tube's path length to its endpoint. In effect, the stream-tube, if followed forward in the flow direction, traces out a path, however straight or tortuous, that a fixed amount of mass per unit time will traverse. In terms of the relationship between an isopipe and its delivery system, this mapping technique can be applied to an arbitrarily selected number of glass stream-tubes that start within the delivery pipe upstream of the isopipe (e.g., at the exit face of the delivery tube) and end at locations along the width of the isopipe.

The mapping can be accomplished via physical modeling (e.g., a properly scaled model of the actual geometry using a properly scaled liquid viscosity to represent the molten glass, such as oil) and/or by mathematical modeling (e.g., numerical simulation based on conservation principles of mass, momentum and energy). In the latter case, the modeling can be performed using customized software or, preferably, with commercially available software packages, such as, for 3-D CAD: AUTOCAD, PRO/ENGINEER, or SOLIDWORKS; for meshing: GAMBIT OR ICEMCFD; and for calculating flows, temperatures, etc.: FLUENT, FLOW3-D, ACUSOLVE, FIDAP, or POLYFLOW.

The magnitude of glass flow in a particular stream-tube is strongly influenced by the glass viscosity, which is itself strongly dependent upon temperature. For a given total flow-rate that is driven by a constant pressure difference in a pipe, it is possible to define stream-tubes whose individual flow rates are substantially different from other stream-tubes simply because their effective viscosities are different. For example, in a stream-tube where the average glass temperature is higher, the average viscosity will be lower which reduces the impedance to flow and yields a relative larger mass flowrate.

FIG. 4 shows a simplified rendering of a platinum delivery pipe that can be used to convey molten glass from the melting/fining/stirring section of a fusion process to an isopipe. Provisions are made in the design of the tube, its electrically heated windings and surrounding insulation to permit the conditioning of the glass, i.e., the establishment of a desired temperature or temperature field at the exit of the pipe. This temperature field is then combined with a stream-tube mapping to determine a mass, thickness, and/or temperature distribution of molten glass on the surface of the isopipe.

Figure 5A:
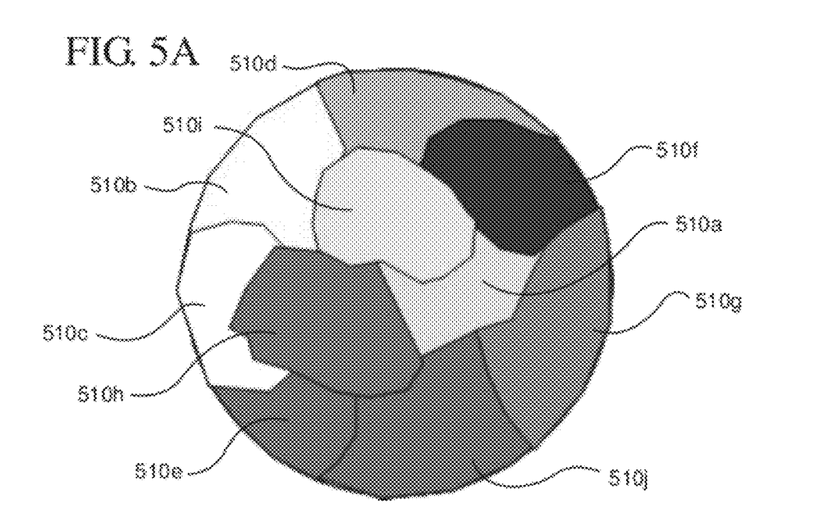
Figure 5B:
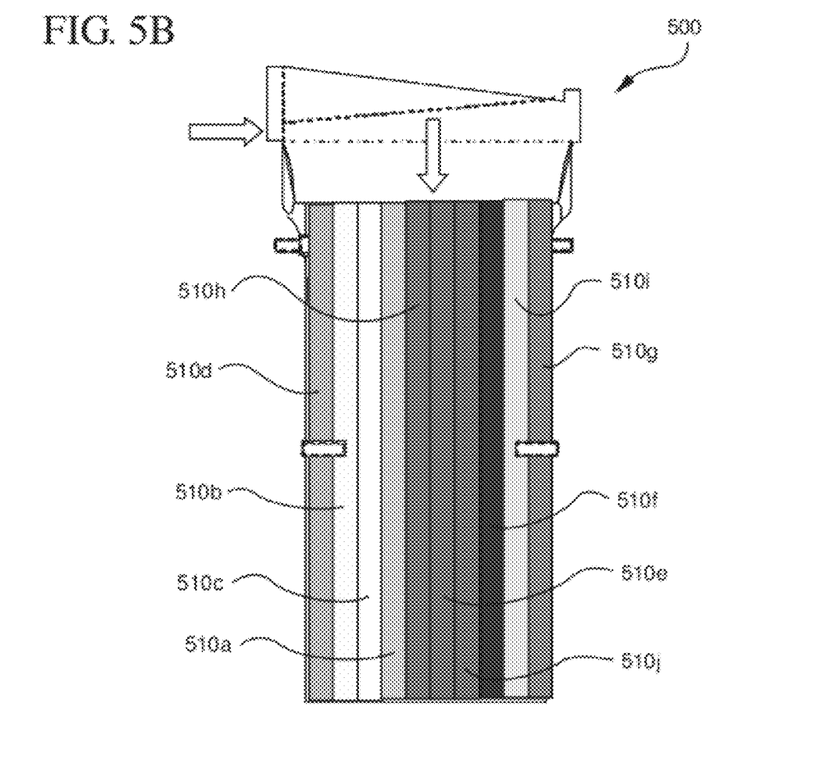

FIG. 5 illustrates such a mapping where FIG. 5A shows a cross-section of the delivery tube at its exit face with the glass flow being normal to this cross-section. Each of areas 510a through 510j is normal to a stream-tube through which flows a fixed percentage (10% in the case of FIG. 5) of the total mass flowrate. FIG. 5B shows the mapping of these stream-tubes to the surface of isopipe 500. In practice, the mapping can be performed backwards with the glass on the surface of the isopipe being divided into stream-tubes of equal width and then used to determine the cross-sectional shapes of the stream-tubes at the delivery tube that will produce such equal widths. This approach was used in constructing FIG. 5.

Figure 6A:
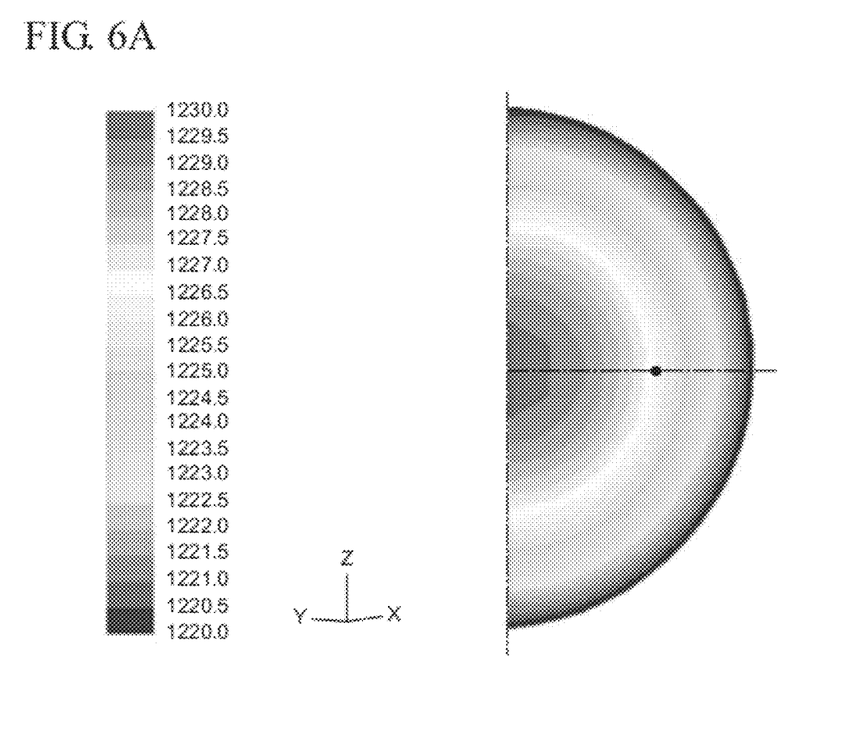
FIG. 6A shows a calculated temperature distribution at the entrance end of a delivery tube.
Figure 6B:
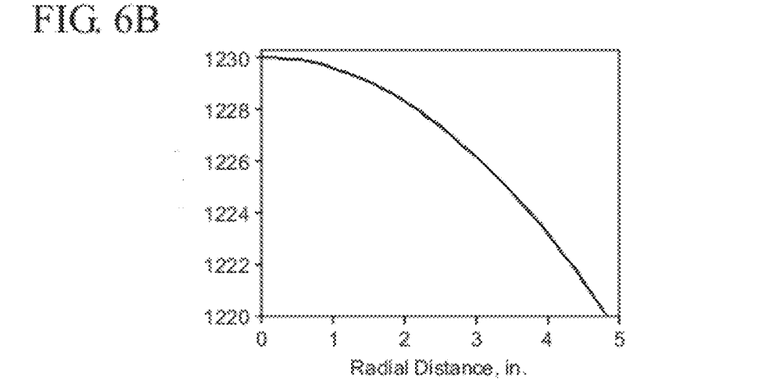
FIG. 6B is a plot of temperature versus radial distance along the horizontal line of FIG. 6A.
Figure 7:
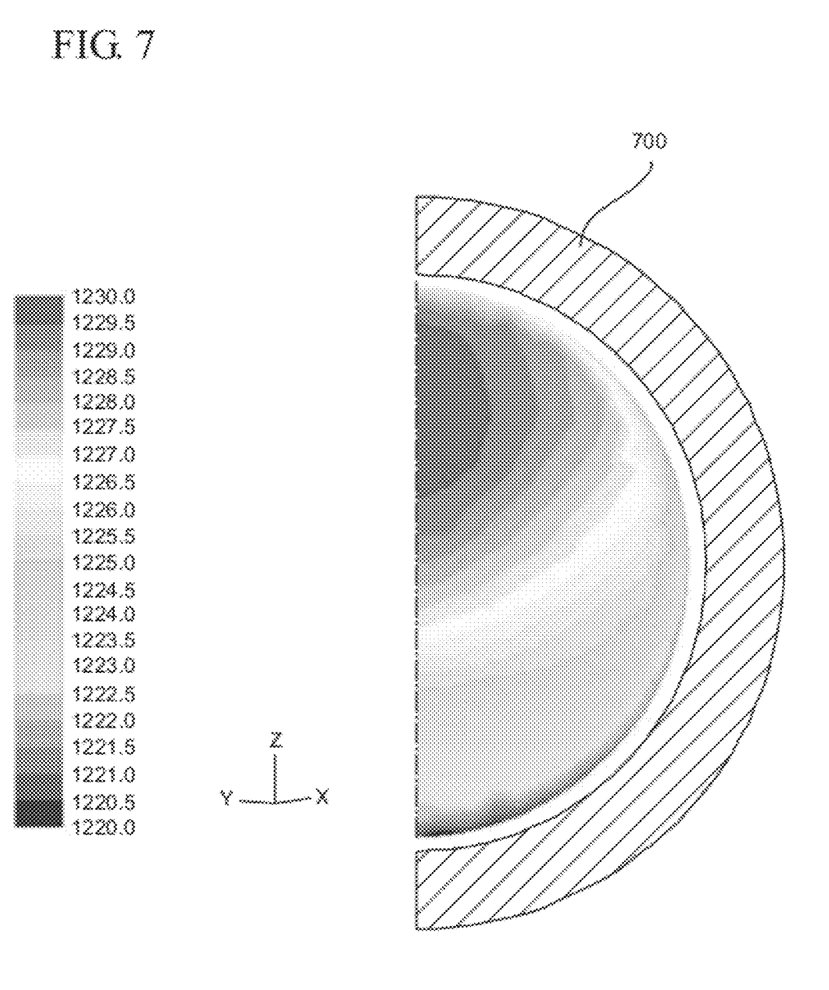
FIG. 7 shows a calculated temperature distribution at the exit end of a delivery tube having the structure of FIG. 4. The heating and insulating elements used for this calculation were azimuthally symmetric.
Figure 8:
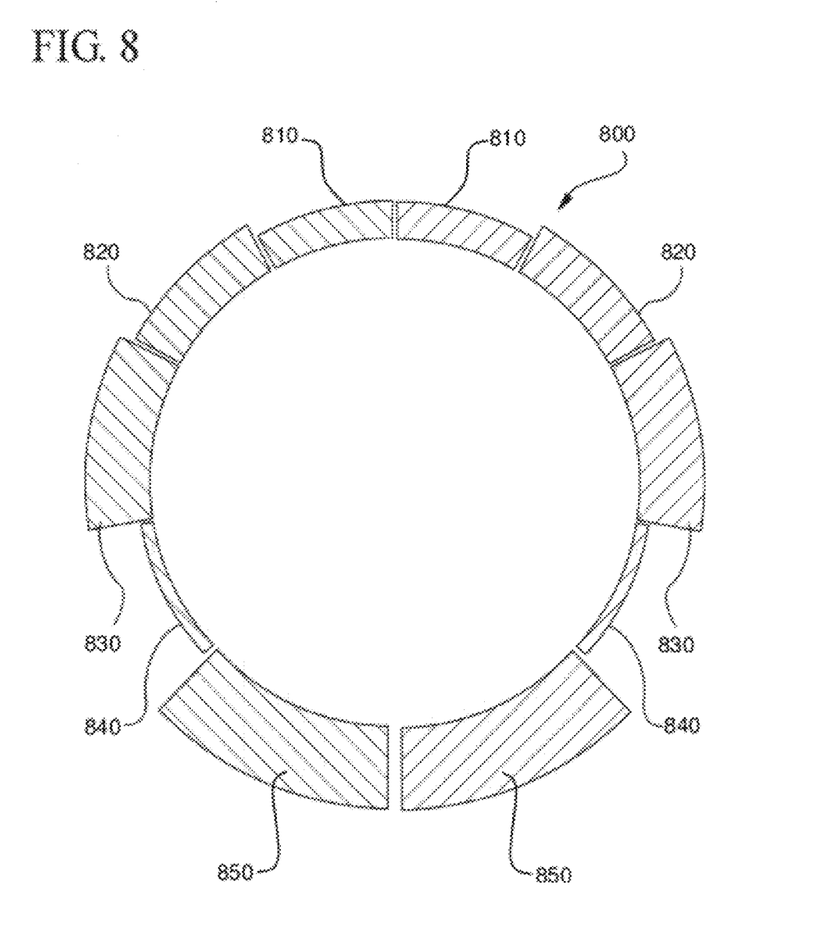
FIG. 8 illustrates heating and/or insulating elements that are azimuthally non-uniform.

FIGS. 6-8 illustrate examples of thermal conditioning that can be used in connection with the mapping of FIG. 5. In particular, FIG. 6A shows a surface map of temperatures at the entrance face of a delivery tube and FIG. 6B shows a plot of temperature versus radial distance from the center of the tube at the entrance face along the horizontal line of FIG. 6A. Because the temperature distribution is azimuthally symmetric, the plot of FIG. 6B applies to any radius through the center of the entrance face. The temperature profiles depicted in these figures can be used as a prescribed boundary condition for the entrance of the delivery tube in subsequent mapping calculations.

FIG. 7 shows a calculated temperature distribution at the delivery tube's exit face for azimuthally symmetric heating and insulation of the tube represented schematically in FIG. 7 by reference number 700. For this system, the electrical windings and insulation associated with any given section of the delivery pipe completely surround the circumference of the section. Accordingly, an adjustment to, for example, the power setting of a winding to control heat loss/gain occurs uniformly around the perimeter. Such an arrangement does not then lead to controlled, local differentiations of the glass temperature, and hence viscosity. In effect, the windings/insulation do not allow the independent (or nearly independent) adjustment to the stream-tube flow rates, which limits the ability to dictate desired flow distributions on the isopipe.

Comparing the temperature distribution of FIG. 7 with that of FIG. 6A shows that the highest temperatures now occur at the upper portion of the face, rather than at the middle. FIG. 8 schematically illustrates the use of azimuthally asymmetric (azimuthally non-uniform) heating and/or insulation 800 in place of the azimuthally symmetric (azimuthally uniform) heating and insulation 700 of FIG. 7. The individual elements 810 through 850 represent locally different heating elements, heating powers, insulation types, and/or insulation thicknesses. Although the azimuthal asymmetry of FIG. 8 retains midplane symmetry, in practice, such symmetry is not required.

By selecting the values of individual elements 810 through 850, the temperature distribution of FIG. 7 can, for example, be adjusted to approximate the temperature distribution of FIG. 6A. Alternatively, the selected values can be used to approximate a different temperature distribution which has been shown through mapping and/or experimentation to be associated with a desired mass, thickness, and/or temperature distribution on the surface of the isopipe. Thus, by proper selection of the insulation materials and power dissipations for a given total flowrate of glass, i.e., by controlled cooling (or possibly heating) of the glass, thermal conditioning is achieved which, in turn, leads to improved glass flow management at the surface of the isopipe.

More generally, the azimuthally non-uniform heating and/or insulating shown in FIG. 8 illustrates more independent control of the glass temperature field and hence flow mapping than previously employed in the art. By using a plurality of winding elements and/or a plurality of insulation levels in the various zones employed to thermally condition glass entering an isopipe, the molten glass can be thermally conditioned in such a manner as to permit the adjustment of flow rates associated with the mass distribution mapping. For example, with a known mapping, it is possible to alter the power settings of particular windings to force more or less mass flow to a particular location on the isopipe (e.g., the inlet bead region).

The thermal conditioning performed upstream of the isopipe should be "married" with the subsequent thermal conditioning that the glass experiences as it flows from the inlet end of the isopipe to the isopipe's far end. Glass in stream-tubes whose path lengths terminate far from the isopipe inlet will have longer residence times, and hence, more time to exchange heat with neighboring tubes and the surroundings than the glass that enters the isopipe and then exits in the vicinity of the inlet. It is precisely for this reason that controlling the initial thermal condition of the various stream-tubes as they start on their respective paths can be leveraged to improve isopipe flows.

Without intending to limit it in any manner, the present disclosure is illustrated by the following example.

EXAMPLE

This example illustrates the use of non-uniform heating along the length of a conduit to affect the temperature distribution across the conduit's exit face. More particularly, the example illustrates the use of non-uniform heating of the perimeter of a conduit having an angled or curved intermediate section between two substantially straight sections.

The conduit used in the analysis had the configuration shown in FIG. 4. Average temperatures and the difference between the maximum temperature and the minimum temperature (the range) at the exit face of the conduit were calculated for winding powers P1 through P5 for zones 430 through 470, respectively. The calculations also assumed the presence of two additional windings P6 and P7 downstream from the conduit at the entrance to the isopipe's trough.

The results of the calculations are shown in Table 1. As can be seen therein, equal percentage increases in the power levels of all of the windings was able to reduce the temperature range at the exit face of the conduit to some extent, i.e., from 4.5° C. to 3.6° C., but at the cost of an increased average temperature, i.e., from 1221.8° C. to 1226.0° C., which may be undesirable for many applications. Moreover, the reduction in the temperature range was not nearly as much as that achieved by redistributing the power levels so that the intermediate section was heated to a greater extent than either of the entrance or exit sections. As shown by a comparison of the first and last rows of the table, for this latter approach, the temperature range dropped from 4.5° C. to 1.6° C., i.e., a reduction of more than 60%, with a smaller increase in the average temperature, i.e., from 1221.8° C. to 1223.6° C.

Similar results are achieved by insulating the entrance and exit sections to a lesser extent than the intermediate section or by combinations of non-uniform heating and non-uniform insulating. Likewise, heating and/or insulation that is azimuthally non-uniform can be used to reduce the temperature range at the exit end of the conduit. More generally, such longitudinal and/or azimuthal non-uniformities can be used to produce a variety of temperature distributions at the exit end of a conduit which generate desirable mass, thickness, and/or temperature distributions on the sheet-forming surface of an isopipe or other downdraw structure.

A variety of modifications that do not depart from the scope and spirit of the invention will be evident to persons of ordinary skill in the art from the foregoing disclosure. For example, although the invention has been illustrated using conduits having circular perimeters, it can also be used with conduits having different shapes, e.g., elliptical perimeters. The following claims are intended to cover these as well as other modifications, variations, and equivalents of the specific embodiments set forth herein.

TABLE 1

| Winding Power Per Zone, Watts | | | | | | | Temperature, ° C. | |
| --- | --- | --- | --- | --- | --- | --- | --- | --- |
| P1 | P2 | P3 | P4 | P5 | P6 | P7 | Average | Range |
| 728 | 520 | 364 | 299 | 169 | 104 | 52 | 1221.8 | 4.5 |
| 840 | 600 | 420 | 345 | 195 | 120 | 60 | 1223.0 | 4.2 |
| 1120 | 800 | 560 | 460 | 260 | 160 | 80 | 1226.0 | 3.6 |
| 1680 | 1200 | 840 | 690 | 390 | 240 | 120 | 1231.9 | 3.6 |
| 0 | 0 | 800 | 1580 | 70 | 0 | 0 | 1223.6 | 1.6 |

What is claimed is:

1. A method for conveying molten glass comprising passing the molten glass through a conduit having an entrance and an exit, wherein:
   (A) the conduit comprises:
      (i) an entrance section,
      (ii) an intermediate section, and
      (iii) an exit section;
   (B) the entrance and exit sections are substantially straight;
   (C) the intermediate section is angled or curved; and (D) more heat is applied to the intermediate section than to either the entrance or exit sections, or both the entrance and exit sections are less insulated than the intermediate section, or more heat is applied to the intermediate section than to either the entrance or exit sections and both the entrance and exit sections are less insulated than the intermediate section;

wherein:

(a) molten glass leaving the exit is conveyed to forming apparatus of an overflow downdraw process;

(b) a desired cross-sectional temperature distribution at the exit is defined that affects the mass, thickness, and/or temperature distribution of molten glass on the surface of the forming apparatus; and (c) the heating and/or insulating specified in (D) produces a cross-sectional temperature distribution at the exit that approximates the desired cross-sectional temperature distribution.

2. The method of claim 1 wherein:

(I) the conduit has a perimeter and a length; and (II) at least one location along the conduit's length, the method comprises producing non-uniform heat transfer with the molten glass by:

(i) non-uniformly insulating the conduit's perimeter; or (ii) non-uniformly heating the conduit's perimeter; or (iii) non-uniformly insulating and non-uniformly heating the conduit's perimeter;

where the non-uniformity in insulating and/or heating is an azimuthal non-uniformity.

3. The method of claim 2 wherein the non-uniformity in the conduit's insulation is selected from the group consisting of differences in type of insulation, differences in the thickness of insulation, and combinations thereof.

4. The method of claim 2 wherein the average temperature of the molten glass at the exit is lower than the average temperature at the entrance.

5. The method of claim 2 wherein the non-uniform insulating, non-uniform heating, or non-uniform insulating and non-uniform heating of step II produces a cross-sectional temperature distribution at the exit that approximates the desired cross-sectional temperature distribution.

6. The method of claim 2 wherein the molten glass has a free surface and the free surface is located closer to the entrance than to the exit.

7. The method of claim 2 wherein the conduit changes the direction of flow of the molten glass from substantially vertical to non-vertical.

8. The method of claim 2 wherein the perimeter is circular.

9. The method of claim 2 wherein the perimeter is elliptical.

10. The method of claim 1 wherein the direction of flow of the molten glass is substantially vertical at the entrance and substantially horizontal at the exit.

11. The method of claim 1 wherein the molten glass has a free surface and the free surface is located closer to the entrance than to the exit.

12. The method of claim 1 wherein the heating and/or insulating specified in (D) reduces temperature gradients in the molten glass at the exit.

* * * * *